April 23, 1940.   G. J. MANNFOLK   2,198,482
CHOPPER AND SLICER
Filed Jan. 11, 1939
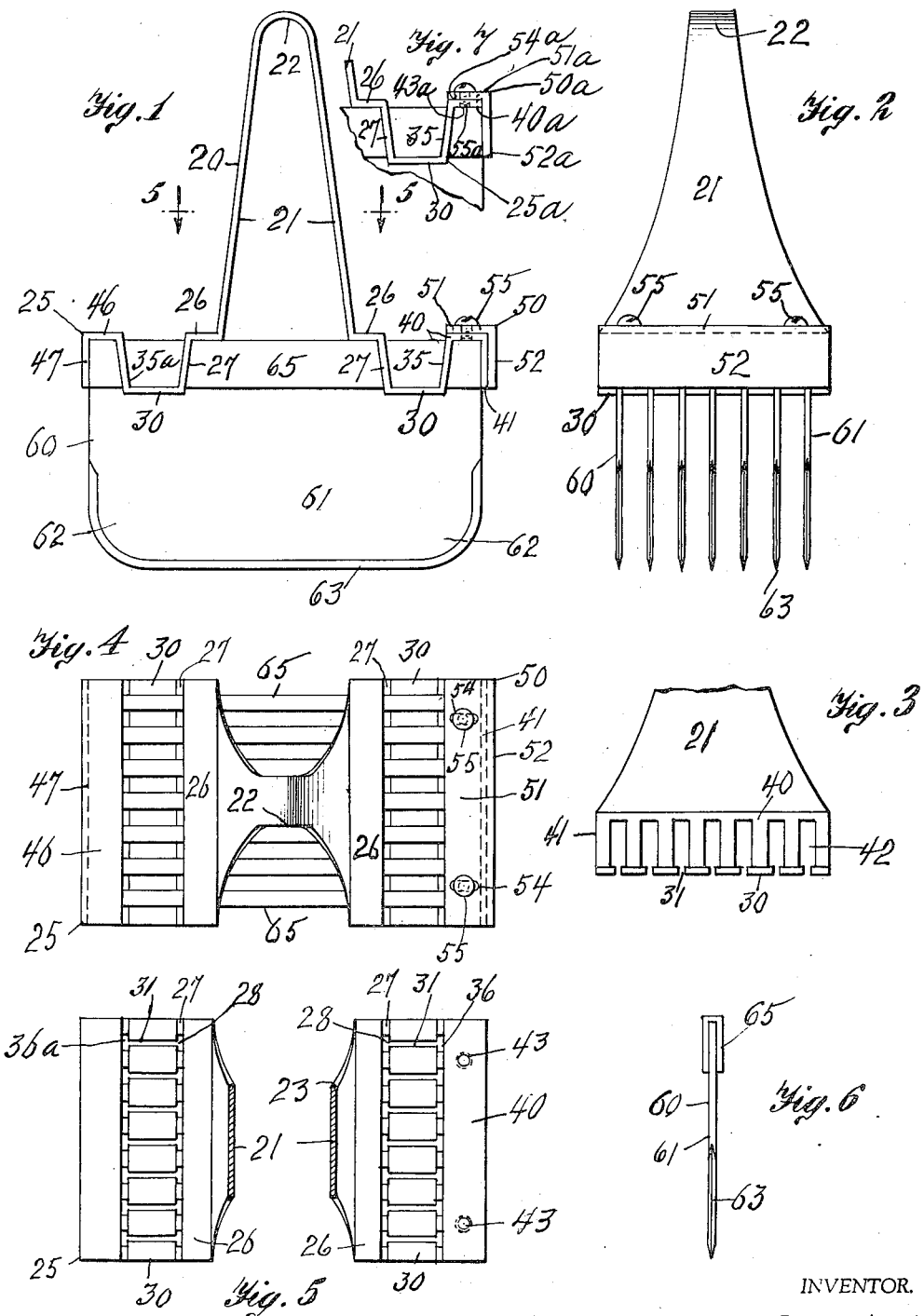
INVENTOR.
GEORGE J. MANNFOLK
BY A. A. de Bonneville
ATTORNEY.

Patented Apr. 23, 1940

2,198,482

UNITED STATES PATENT OFFICE 2,198,482

CHOPPER AND SLICER

George J. Mannfolk, New York, N. Y.

Application January 11, 1939, Serial No. 250,284

4 Claims. (Cl. 30—305)

This invention relates to a chopper and slicer.

The object of the invention is the production of a chopper and slicer having a housing to which a plurality of knives can be easily connected or disconnected.

The second object of the invention is the production of a chopper and slicer which is light in weight and cheap to manufacture.

The third object of the invention is the production of a chopper and slicer with a plurality of knives, which latter can be easily cleaned without detaching them from their operative positions.

In the drawing Fig. 1 represents a side view of an exemplification of the improved chopper and slicer; Fig. 2 shows a right hand view of Fig. 1; Fig. 3 is a view similar to Fig. 2 with a portion broken away and some elements removed; Fig. 4 indicates a top view of Fig. 1; Fig. 5 is a section of Fig. 1 on the line 5, 5 and some elements removed; Fig. 6 represents an end view of a detail and Fig. 7 shows a fragmentary portion of Fig. 1 with a modification.

The chopper and slicer is indicated with a supporting frame of one piece of material indicated in its entirety by the numeral 20. The frame 20 comprises the handle members 21, which converge from their lower to their upper ends, where they are joined by the crown 22.

The ends of the handle members of the chopper and slicer 20, are rounded as shown at 23. From the lower ends of the handle members 21, extends the knife supporting housing designated in its entirety by the numeral 25. The housing 25 comprises the upper horizontal walls 26, which extend from the lower ends of the handle members 21. Inclined walls 27 having the plurality of rectangular openings 28, extend from the walls 26. Lower horizontal walls 30, having the narrow longitudinal openings 31, extend from the walls 27. The openings 31 connect with the openings 28.

From the walls 30, extend the similar inclined walls 35 and 35a similar to 27 and respectively having the rectangular openings 36 and 36a similar to 28 and which connect with their adjacent openings 31. From the wall 35 extends the upper horizontal wall 40, and from the latter wall extends the vertical end wall 41, having the rectangular openings 42. Threaded openings 43 extend through the wall 40.

From the wall 35a extends the upper horizontal wall 46, and from the latter wall extends the vertical end wall 47.

An angle shaped closing member 50, comprises the upper wall 51 and the end wall 52 at right angles thereto. The wall 51 has indicated therethrough the elongated openings 54.

The wall 51 when in operative position bears on the upper wall 40, and the wall 52 bears against the vertical end wall 41, closing the openings 42. Screws 55 extend through the elongated openings 54 and engage the threaded openings 43 in the wall 40.

Knives are each indicated in their entireties by the numeral 60. Each knife 60 comprises the blade 61 having the curved ends 62, and the cutting edge 63. The upper end of each blade is connected to the head member 65.

To insert the knives 60 in operative position, the angle shaped closing member 50 is removed from the housing 25 by first unscrewing the screws 55. The knives 60 are located in position by positioning their head members 65 in the openings 42, 36, 28 and 36a, and bearing an upper end of each knife against the vertical end wall 47. The closing member 50 is then secured in place by the screws 55, and the end wall 52 is brought to bear against the other upper end of each knife. When the knives 60 are positioned in place the blades 61 will extend through the openings 31.

Should the knives vary somewhat in length, the closing member 50 can be placed in proper position by screws 55, functioning with the elongated openings 54.

When the chopper and slicer is used, the handle members 21 are grasped by the user, and the blades 61 can then be used as a chopper for meat and the like and as a slicer for vegetables and the like or for any other material to be chopped or sliced.

When the chopper and slicer bears on an object operated upon it will be evident that the upper ends of the knives, that is to say their head member 65, will bear against the walls 26, 40 and 46. It will also be noted that the lower faces of the head members 65 bear against the walls 30. By this means and the end walls 47 and 52, the knives are detachably held in safe operative position.

Referring to the modification shown in Fig. 7, one of the handle members is again indicated at 21, with its housing 25a similar to 25.

The housing 25a is shown with one of its upper horizontal walls 26, the inclined walls 27 and 35, and the lower horizontal wall 30 as already described. The upper horizontal wall 40a, similar to 40, extends from the adjacent outermost inclined wall 35, and has threaded openings similar to 43, one of which is indicated at 43a. No vertical end wall similar to 41 extends from the upper wall 40a. An angle shaped closing member 50a, similar to 50, is shown with the upper wall 51a, similar to 51 and which has integral therewith the end wall 52a, similar to 52. The wall 51a has extending therethrough elongated openings 54a, similar to 54. Screws 55a, similar to 55 extend through the openings 54a and the threaded openings 43a as already described for Fig. 1.

A fragmentary portion of one of the knives with its blade and head member is shown in operative position in Fig. 7.

In this modification the knives are positioned in the housing 25a as described for the housing 25, and when the closing member 50a, is fastened in place its end wall 52a, bears against the adjacent ends of the knives to hold them in place.

Various modifications may be made in the invention and the present exemplification is to be taken as illustrative and not limitative thereof.

Having described my invention I claim:

1. In a chopper and slicer the combination of handle members, a housing integral with the handle members comprising upper and lower walls, said lower walls having longitudinal openings extending therethrough, inclined walls with openings connecting said upper and lower walls, the latter openings connecting with the openings in the lower walls, an end wall at one end of said housing and a closing member detachably connected to the other end of the housing and knives detachably positioned in the openings of the walls of the housing with one end of each bearing against the end wall of the housing and their other ends bearing against said closing member.

2. In a chopper and slicer the combination of handle members, a housing integral with said handle members, said housing comprising upper and lower walls, said lower walls having longitudinal openings extending therethrough, inclined walls with openings connecting said upper and lower walls, the latter openings connecting with the openings of the lower walls, an end wall at one end of said housing and an end wall having openings at the other end of said housing, knives detachably supported in the housing, each knife comprising a blade and a head member, said head member detachably positioned in the openings of said inclined walls and one end portion of each head member positioned in one of the openings of one of said end walls and the other end of each head member bearing against the other end wall of the housing, the blades of the knives extending through the longitudinal openings of the lower walls of said housing and a closing member for the housing detachably connected thereto over the openings in one of its end walls.

3. In a chopper and slicer the combination of handle members, a housing integral with said handle members, said housing comprising upper and lower walls, said lower walls having longitudinal openings extending therethrough, inclined walls with openings extending therethrough connecting said upper and lower walls, the openings of the inclined walls connecting with the openings of the lower walls, an end wall at one end of the housing, knives detachably supported in the housing, each knife comprising a blade and a head member, said head members detachably positioned in the openings of said inclined walls, one end of each head member bearing against the end wall of the housing, the blades of the knives extending through longitudinal openings of the lower walls of the housing and a closing member comprising an upper wall and an end wall at right angles thereto, said closing member detachably connected to said housing and the other ends of the head members of the knives bearing against the end wall of the closing member.

4. In a chopper and slicer the combination of handle members, a housing integral with said handle members comprising upper and lower walls, said lower walls having narrow longitudinal openings extending therethrough, inclined walls with rectangular openings connecting said upper and lower walls, said rectangular openings at their lower ends connecting with the narrow openings in the lower walls of the housing, an end wall at one end of said housing and an end wall having rectangular openings at the other end of said housing, knives detachably supported in the housing, each knife comprising a blade and a head member, said head members detachably positioned in the rectangular openings of the inclined walls of the housing, and one end portion of each knife positioned in one of the openings of one of the end walls of the housing and the other end of each knife bearing against the other end wall of the housing, the blades of the knives extending through the narrow openings of the lower walls of the housing, a closing member for the housing comprising an upper wall and an end wall, the upper wall of the closing member, bearing on the upper wall at one end of the housing adjacent to its end wall having rectangular openings, the upper wall of the connecting member having enlarged openings extending therethrough, and screws extending through the latter openings in threaded engagement with openings in the adjacent upper wall of the housing, the end wall of the connecting member adjacent to the ends of the knives positioned in the openings of the end wall of the housing adjacent to said closing member.

GEORGE J. MANNFOLK.